June 2, 1959   R. H. McELROY ET AL   2,888,731
MOLDING PRESS
Filed Oct. 16, 1953   12 Sheets-Sheet 1

INVENTOR
ROY H. McELROY
JOHN F. DYKES
BY Toulmin & Toulmin
ATTORNEYS

June 2, 1959 R. H. McELROY ET AL 2,888,731
MOLDING PRESS
Filed Oct. 16, 1953 12 Sheets-Sheet 2

INVENTOR
ROY H. McELROY
JOHN F. DYKES
BY Toulmin & Toulmin
ATTORNEYS

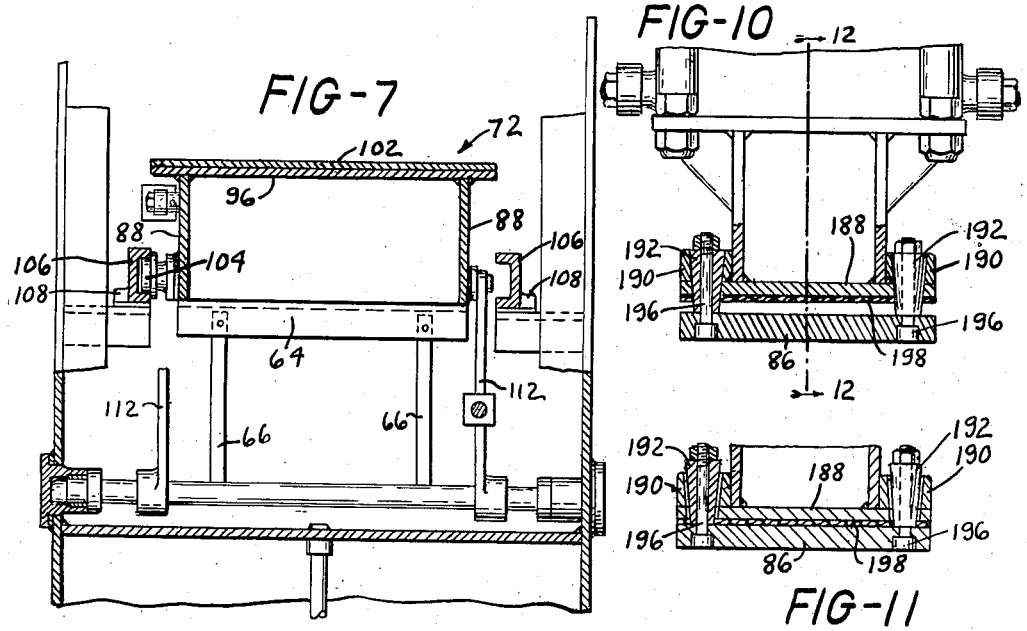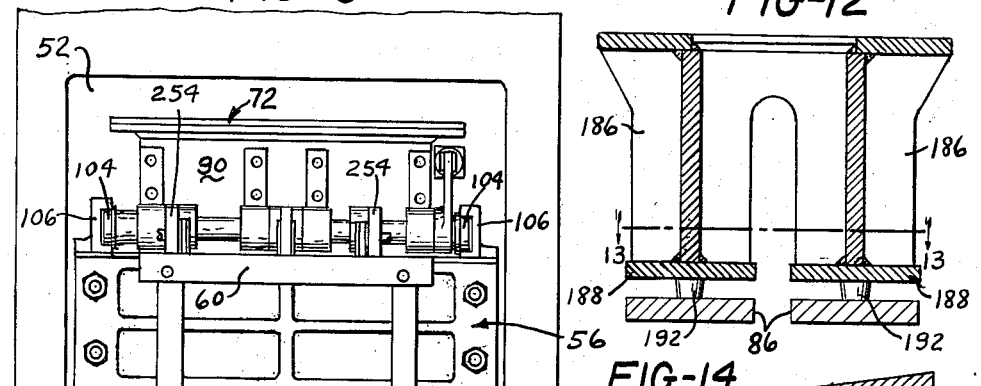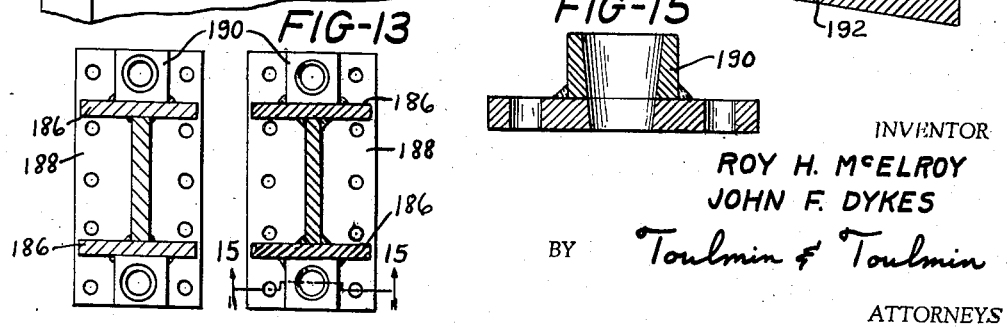

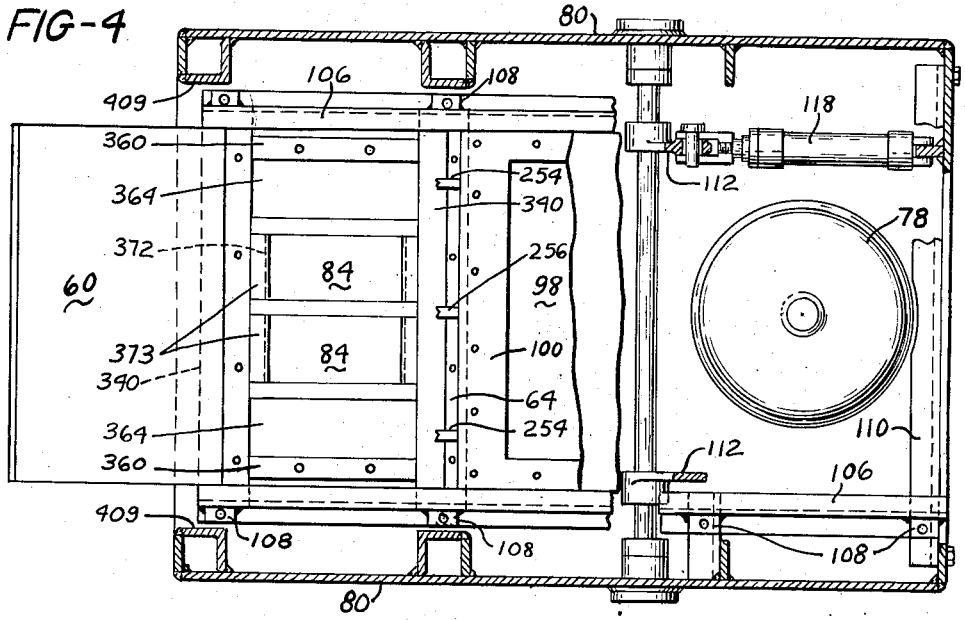
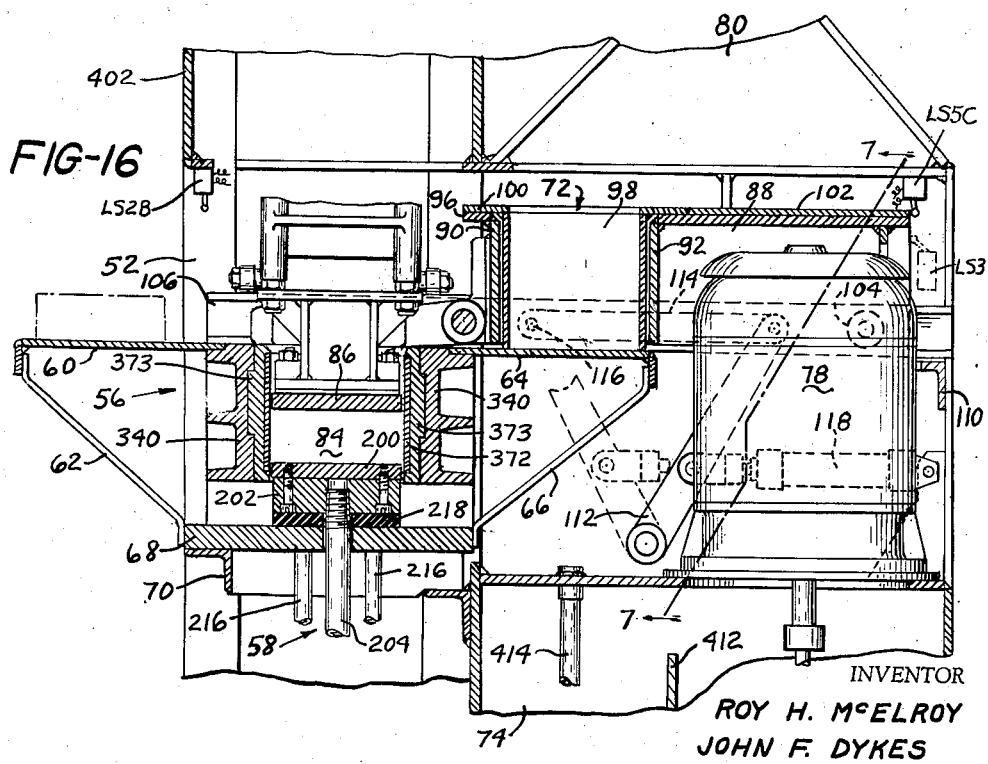

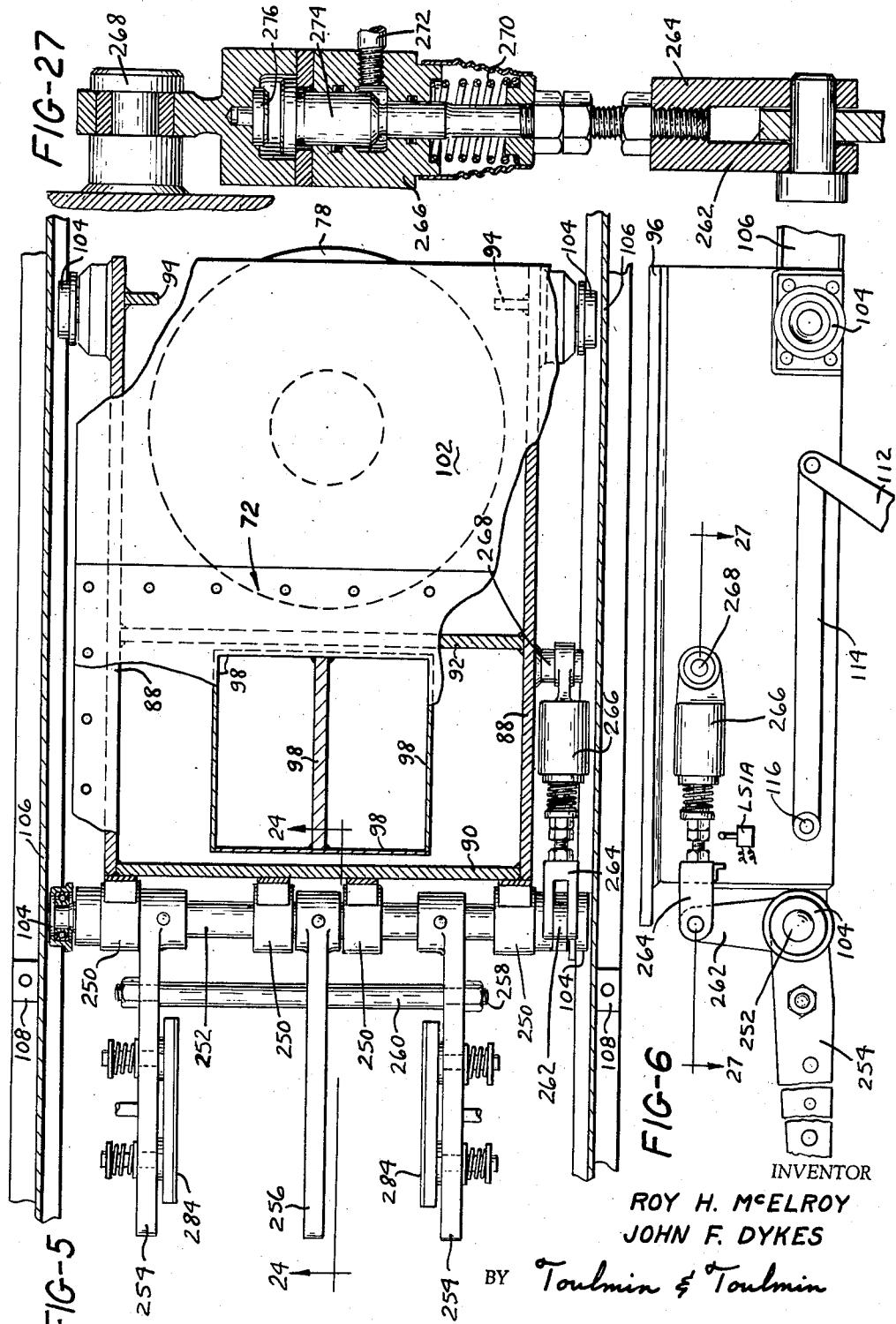

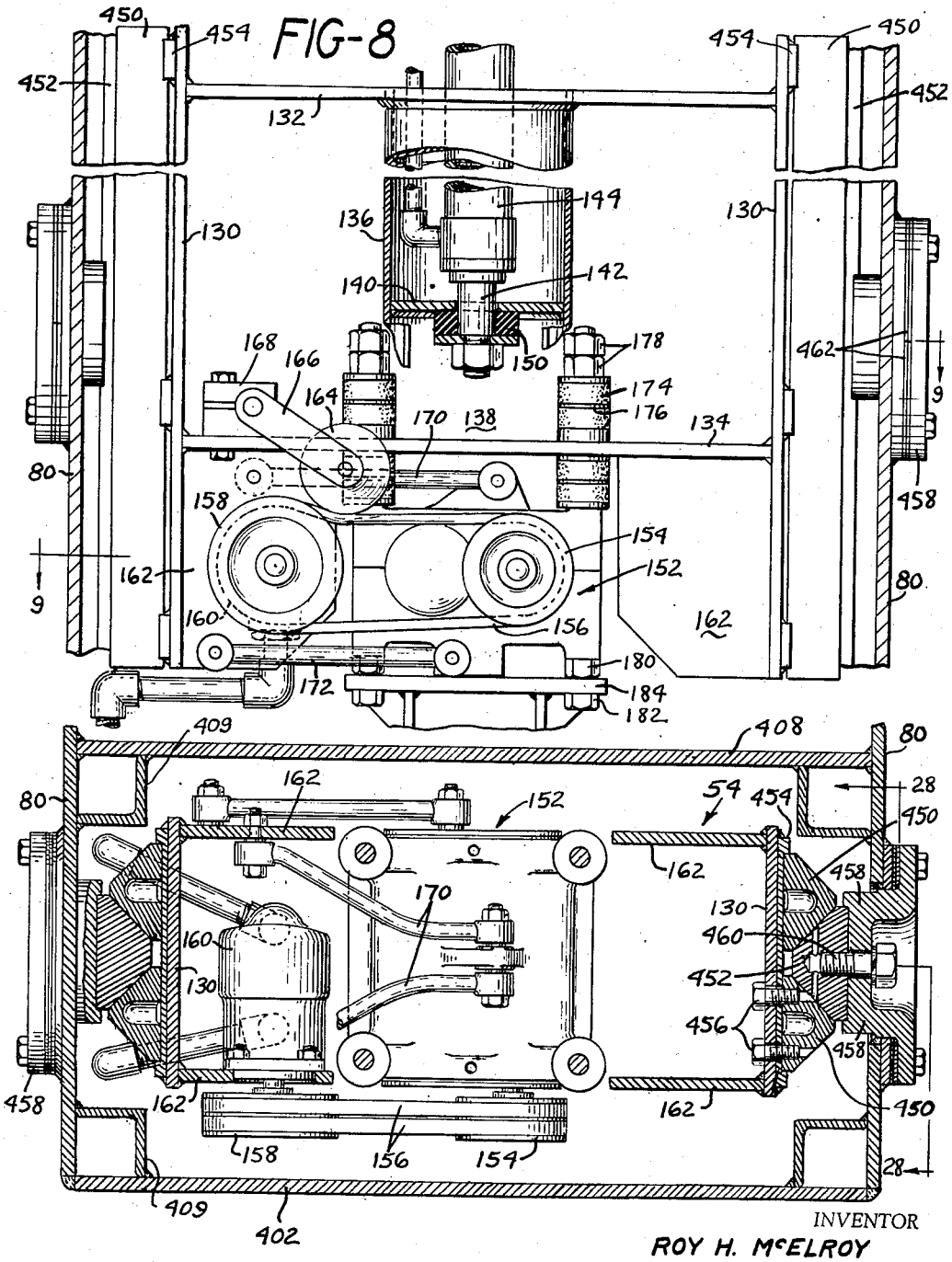

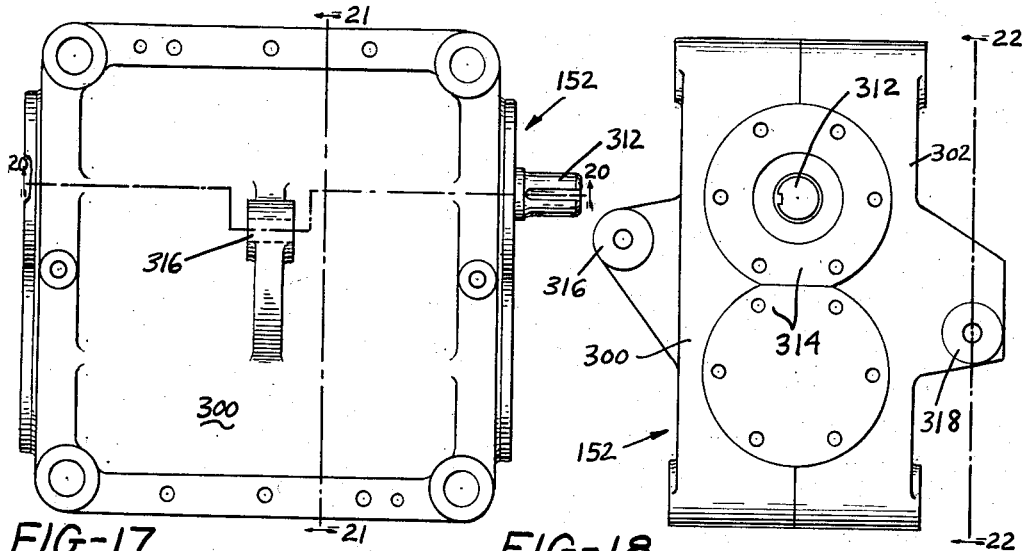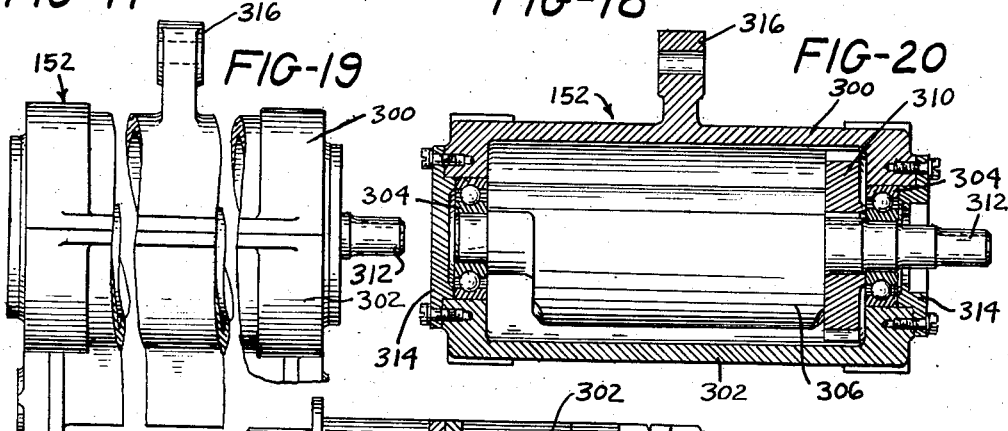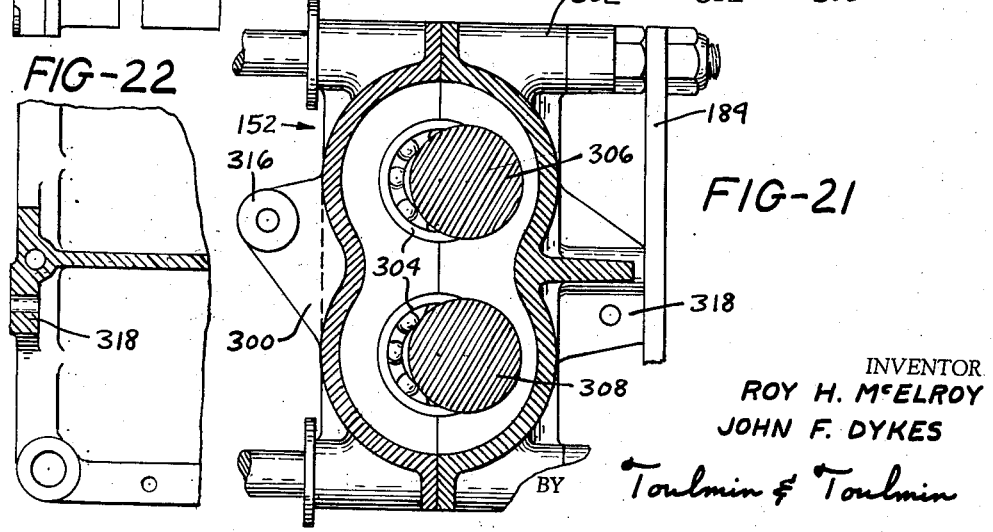

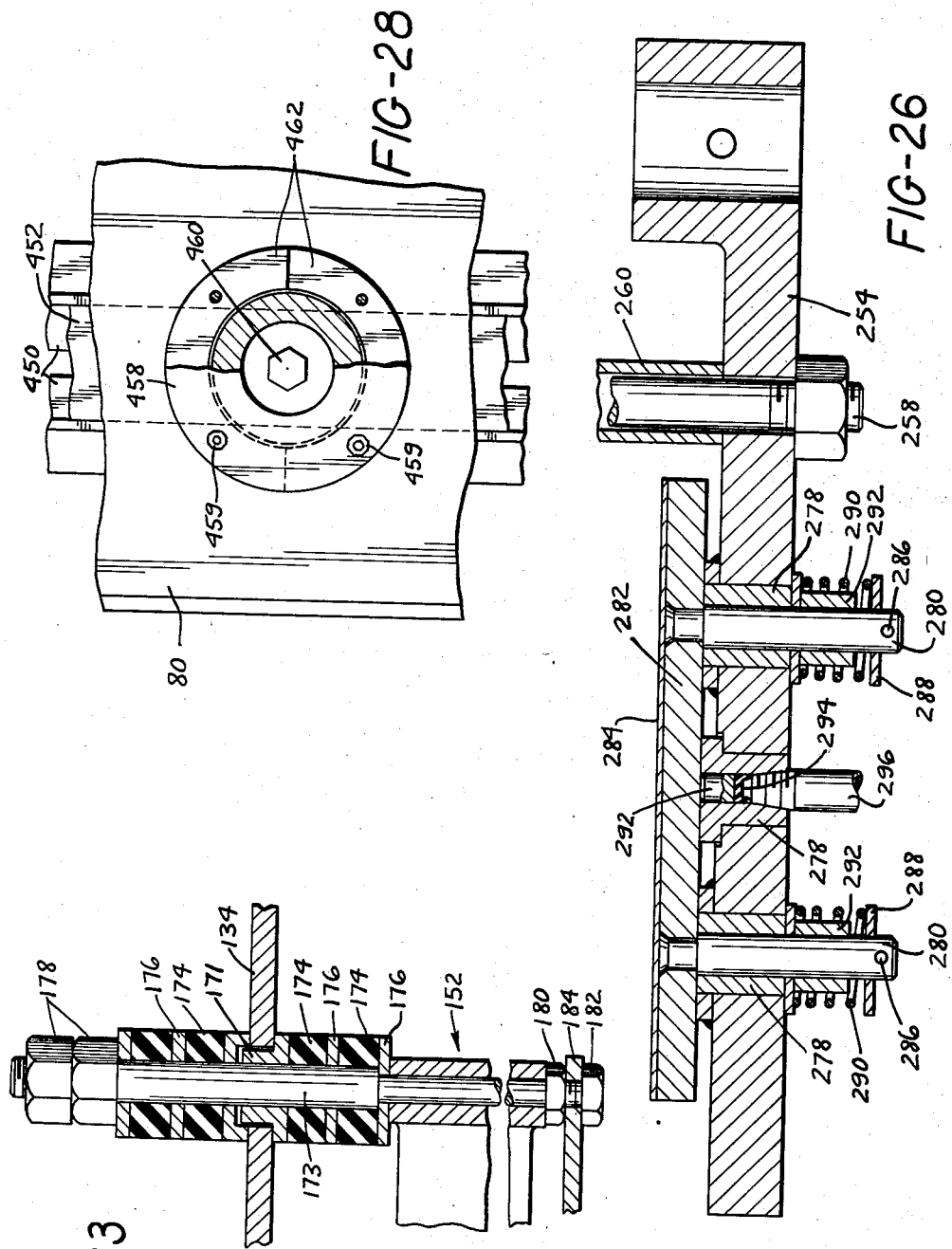

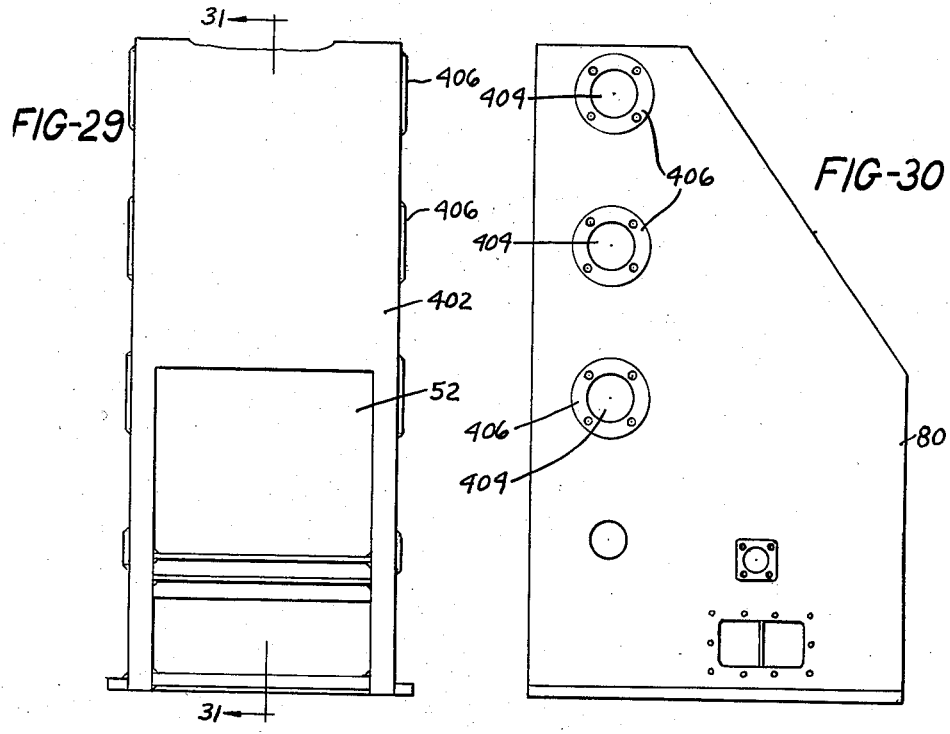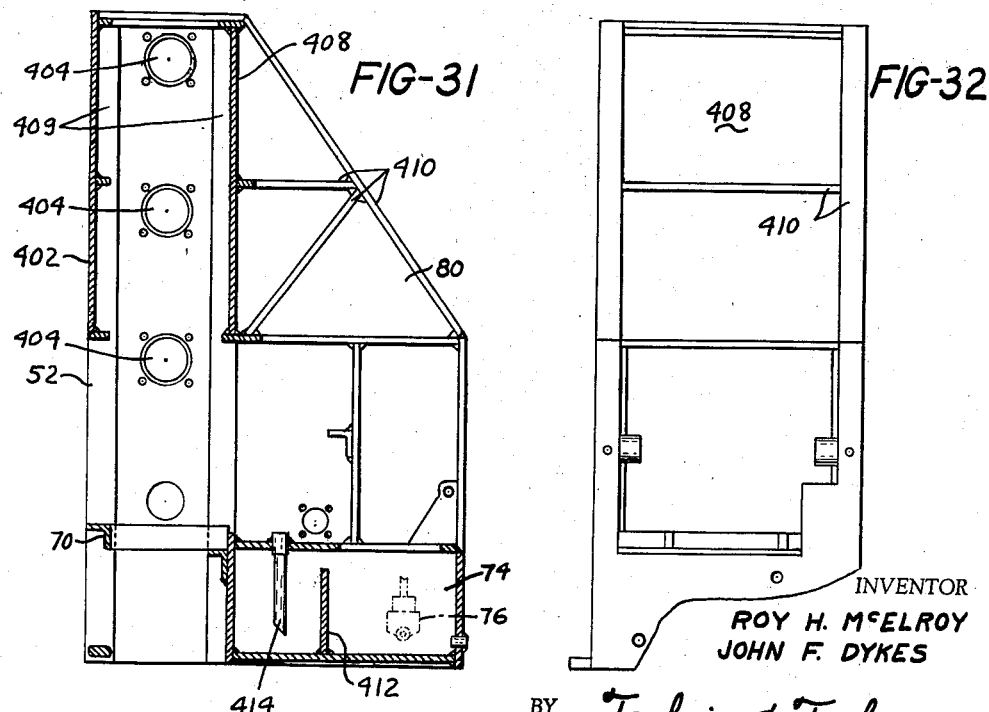

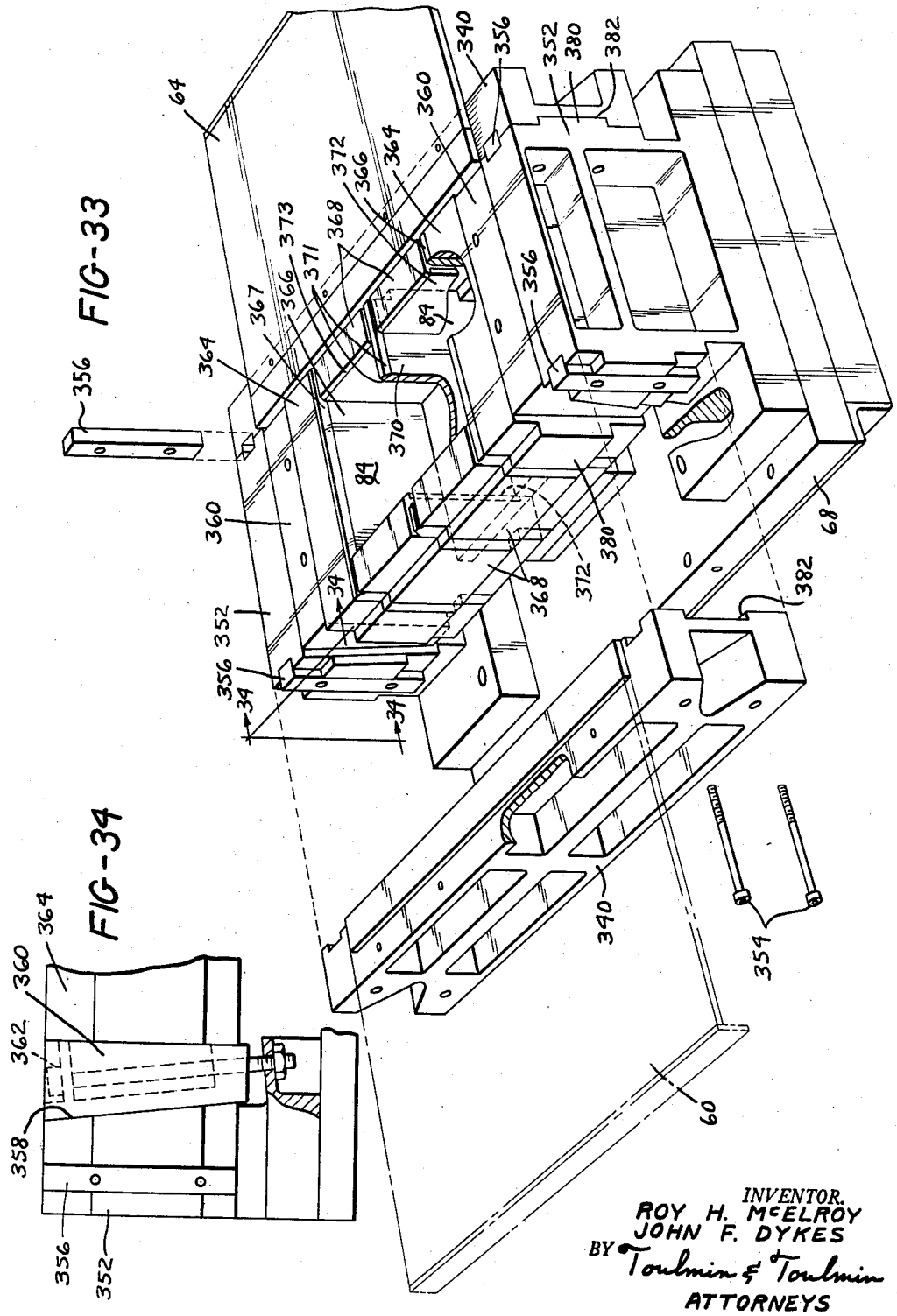

June 2, 1959     R. H. McELROY ET AL     2,888,731
MOLDING PRESS

Filed Oct. 16, 1953     12 Sheets-Sheet 11

INVENTOR
ROY H. McELROY
JOHN F. DYKES
BY Toulmin & Toulmin
ATTORNEYS

June 2, 1959   R. H. McELROY ET AL   2,888,731
MOLDING PRESS
Filed Oct. 16, 1953   12 Sheets-Sheet 12
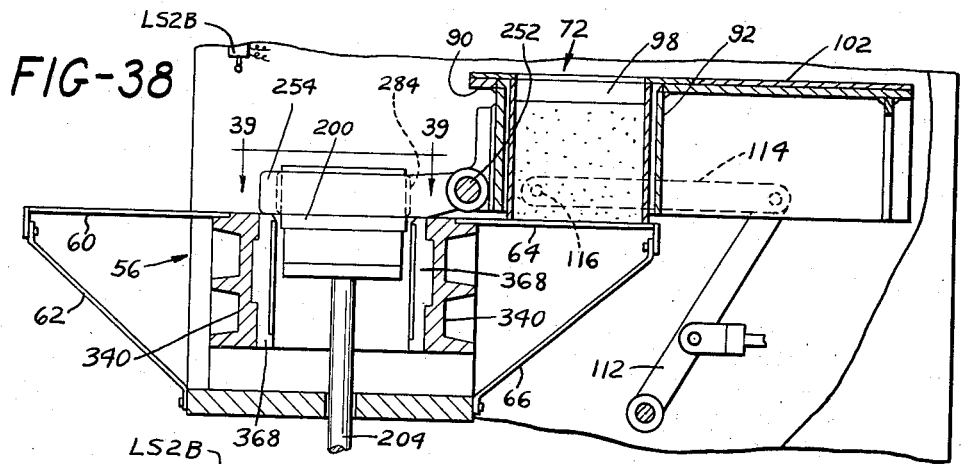
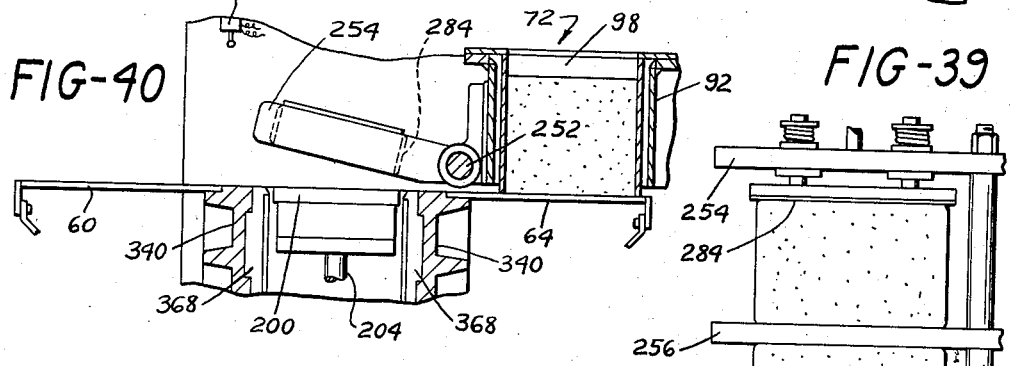
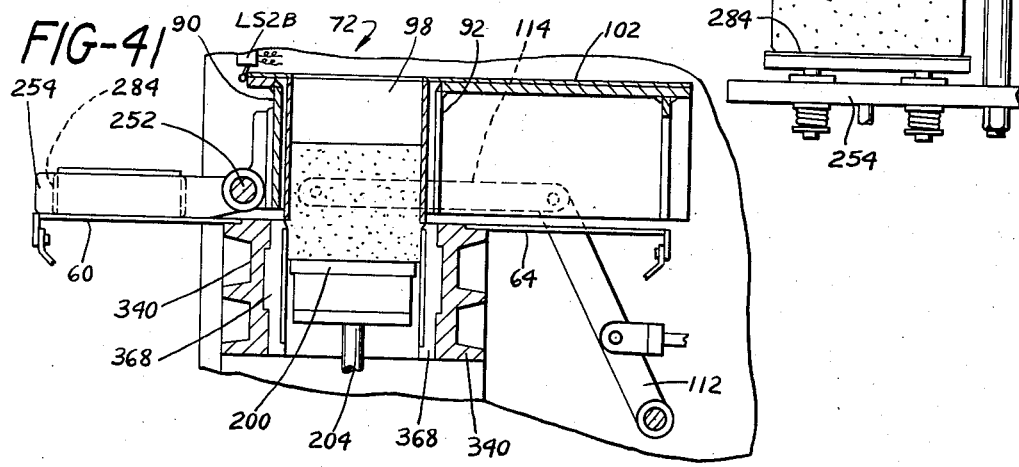
INVENTOR.
ROY H. McELROY
JOHN F. DYKES
BY Toulmin & Toulmin
ATTORNEYS

United States Patent Office 2,888,731
Patented June 2, 1959

2,888,731

MOLDING PRESS

Roy H. McElroy, Dayton, and John F. Dykes, Columbus, Ohio, assignors to International Clay Machinery of Delaware, Inc., Dayton, Ohio, a corporation of Delaware Application October 16, 1953, Serial No. 386,621

4 Claims. (Cl. 25—45)

This invenion relates to a press and to a novel method of compacting materials in a press. In particular, this invention relates to a method and apparatus for compacting granular and claylike materials to predetermined shapes before being placed in baking ovens.

A particular object of the present invention is to provide a press structure, and a method of operation thereof, for handling materials that are to be compaced into various forms such as bricks and the like in which an improved production results in that a uniform compactness of the pressed article is obtained.

Another object of the present invention is the provision of a method and apparatus for pressing particulate materials in which an improved feeding arrangement is employed whereby the material can readily and evenly be fed into a mold cavity.

A further particular object is the provision of an improved press structure, but being inexpensive to construct, embodying adjustments whereby the press can be maintained with close operating tolerances at all times.

A still further object of this invention is the provision of a press structure, and a method of operating the press structure, for compacting particulate materials into bricks and the like wherein the press is readily convertible from one type of work member to another.

A further object is the provision of an improved ejecting means for removing pressed work members from the presses after a compacting cycle.

Still another object is to provide an improved mold structure for a press of the nature referred to, and which mold structure is readily adjustable to provide for work members of different sizes.

A still further object of this invention is the provision of pressing means for a press of the nature referred to in which the material being pressed is free to shift somewhat within the mold while being pressed, thereby to remove voids from the material and to distribute and orient material in the cavity thereby providing for compacted work members of uniform density, and, therefore, of superior quality.

Still another particular object of this invention is the provision of a press structure, and a method of operating the structure, in which large and expensive pressing motors are eliminated and, instead, the compacting of the material being pressed is by a vibratory movement of the press platen.

A still further object is the provision of control means for controlling the operation of a press of the nature referred to when operated according to the method of this invention.

These and other objects and advantages of this invention will become more apparent upon reference to the following specification taken in connection with the accompanying drawings, wherein:

Figure 3 is a partial front elevational view looking in, in the direction of the arrow 3 in Figure 1;

Figure 4 is a plan sectional view indicated by line 4—4 on Figure 1;

Figure 5 is a plan sectional view similar to Figure 4 but taken at a higher level, and indicated by line 5—5 on Figure 1;

Figure 6 is a side elevational view of the charging box illustrated in plan section in Figure 5;

Figure 7 is a partial vertical sectional view indicated by line 7—7 on Figure 1 showing the charging box of Figures 4, 5 and 6 from the rear;

Figure 8 is a partial vertical sectional view indicated by line 8—8 on Figure 1 showing the arrangement and construction of the crosshead or pressing platen of the press;

Figure 9 is a plan section showing details of construction of the crosshead and the guiding means therefor, and indicated by line 9—9 on Figure 8;

Figure 10 is a view looking in at the side of the working end of the crosshead, as indicated by arrow 10 on Figure 2;

Figure 11 is a fragmentary view similar to Figure 10, but showing the die plate that is movably suspended on the lower end of the crosshead moved up into a position it occupies when the crosshead is bearing on the materials within the mold cavity of the press;

Figure 12 is a sectional view indicated by line 12—12 on Figure 10 showing the dual construction of the crosshead in the lower end thereof and the die plates carried thereby;

Figure 13 is a plan sectional view indicated by line 13—13 on Figure 12;

Figure 14 is a perspective view showing a tapered guide element, one of which is fixed at each end of the plates suspended from the crosshead;

Figure 15 is a sectional view showing the member carried by the crosshead for receiving the tapered pin of Figure 14;

Figure 16 is a fragmentary sectional view similar to Figure 1 showing the crosshead lowered into working position into the mold cavity;

Figure 17 is a plan view looking down on top of a vibrator unit forming a part of the crosshead assembly;

Figure 18 is a view of the vibrator looking in from the right side of Figure 17;

Figure 19 is a view looking in from the bottom of Figure 17 and partially broken away;

Figure 20 is a sectional view indicated by line 20—20 on Figure 17 showing the arrangement within the vibrator of the two shafts carrying off-center masses that produce vibratory action of the vibrator;

Figure 21 is a sectional view indicated by line 21—21 on Figure 17 showing the orientation within the vibrator of the shafts carrying the off-center masses;

Figure 22 is a fragmentary section indicated by line 22—22 on Figure 18;

Figure 23 is a sectional view indicated by line 23—23 on Figure 2 showing the resilient connection between the vibrator unit and the frame of the crosshead of the press;

Figure 26 is a sectional view indicated by line 26—26 on Figure 1 showing in detail the construction of one of the outer of the pickup arms of the pickup arrangement;

Figure 27 is a sectional view indicated by line 27—27 on Figure 6 showing the construction of the lift cylinder of the pickup arrangement of the press;

Figure 28 is a fragmentary view showing the manner in which shims are provided for adjustably clamping a guide member to the press frame;

Figure 29 is a front elevational view of the frame of the press before parts of the press are assembled therein;

Figure 30 is a side elevational view of the press frame;

Figure 31 is a vertical sectional view indicated by line 31—31 on Figure 30;

Figure 32 is a rear elevational view of the frame of the press;

Figure 33 is a perspective view partly in section and partly exploded showing the construction of the novel mold according to the present invention;

Figure 34 is a sectional view indicated by line 34—34 on Figure 33;

Figure 38 is a fragmentary view showing the machine at one stage of an operative cycle thereof when the bricks have been pushed from the mold cavity, ejected and gripped by the lifting fingers;

Figure 39 is a sectional view indicated by line 39—39 on Figure 38 showing how the lifting fingers grip the bricks;

Figure 40 is a view showing the bricks lifted from the top of the mold; and

Figure 41 shows the charging box advanced into position over the mold, with the bricks set down on the receiving table therefor and with the material in the charging box being transferred into the mold cavity.

Figure 1:
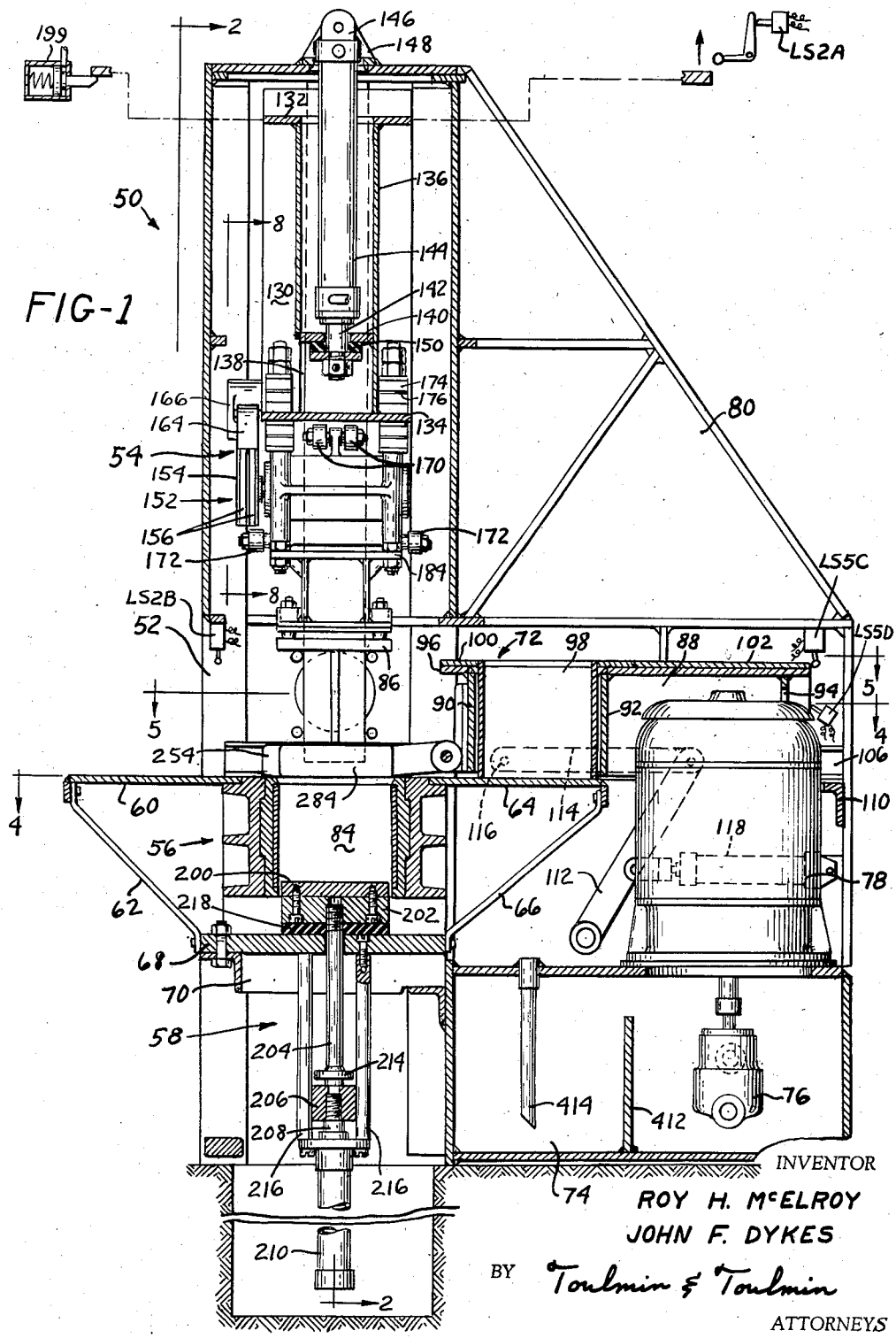
Figure 1 is a vertical longitudinal section taken through a press according to this invention, and indicated by line 1—1 on Figure 2.
Figure 2:
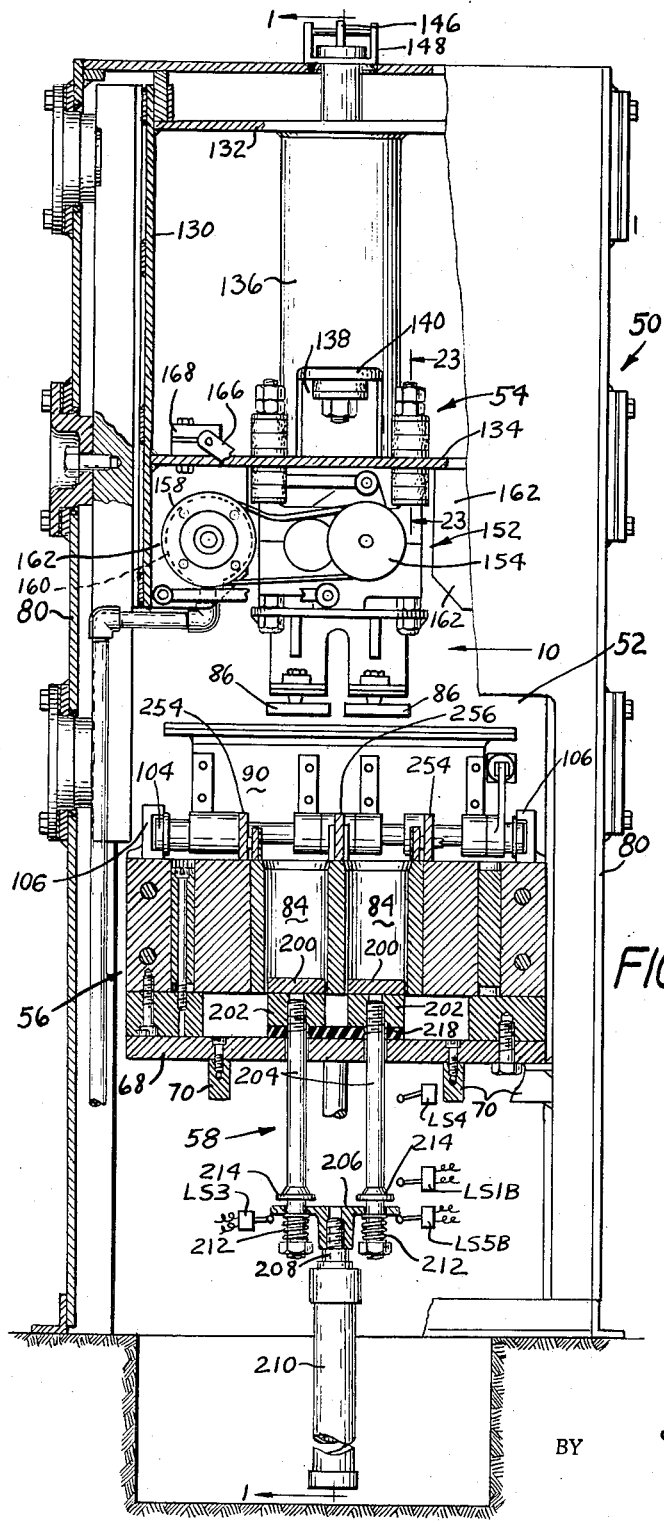
Figure 2 is a view looking in from the front of the press and with the press partly in section, as indicated by line 2—2 on Figure 1.
Figure 24:
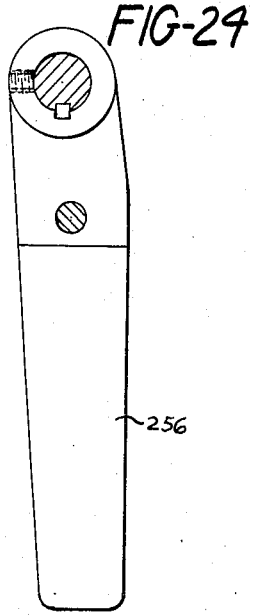
Figure 24 is a sectional view indicated by line 24—24 on Figure 5 showing the center arm that forms a portion of the pickup mechanism of the press.
Figure 25:
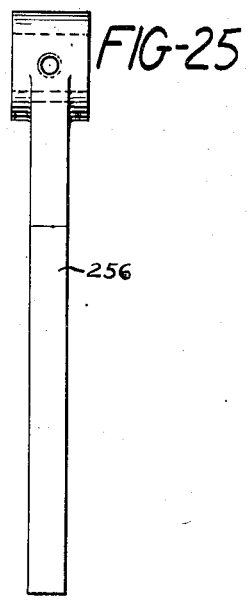
Figure 25 is a plan view looking down on top of the arm of Figure 24.

Referring to the drawings somewhat more in detail and particularly to Figures 1 and 2, the press, according to the present invention, comprises a press frame 50 having an opening in the front wall at 52. The upper portion of frame 50 receives a press crosshead assembly generally indicated at 54, while the lower portion of the press beneath the opening 52 contains a mold assembly generally indicated at 56, and ejector means generally indicated at 58.

The mold assembly 56 has a front table portion 60 extending outwardly from the front of the press and supported by brackets or braces 62, and a rear table portion 64 extending rearwardly from the mold assembly and supported by brackets or braces 66. The lower ends of brackets or braces 62 and 66 are connected with a bolster plate 68 mounted in the machine frame as by the supporting framework 70 beneath the bolster plate.

The rear table 64 has positioned thereover a charging box generally indicated at 72 which can be moved from its Figure 1 position inwardly over the mold assembly 56 for transferring material to be pressed into the mold cavity.

In the rear of the frame of the machine there is provided an oil sump 74 within which is located a pump 76 connected for being driven by the electric motor 78 mounted on top of the sump and positioned at the back of the press behind and beneath the rear portion of the charging box assembly 72.

The press frame, as will be described more fully hereinafter, comprises side plates 80 extending upwardly above the rearwardly projecting portions of the press frame above the oil sump in back of the upstanding front portion of the frame, and with the side plates 80 defining an open space therebetween at the back of the press through which material can be introduced into the cavity of the charging box.

Material to be pressed which is in the charging box is transferred to the cavities 84 of the mold assembly 56 and is compacted therein by the pressing action of die plates 86 carried on the bottom of the crosshead.

*Charging box assembly*

The charging box assembly 72 is illustrated in some detail in Figures 3, 4, 5, 6 and 7, taken together with Figures 1 and 2. In these figures it will be observed that the charging box assembly is made up of a pair of spaced side plates 88 and a transverse plate 90 at the front end thereof. Between the front and back ends of side plates 88 is a second transverse plate 92 so that a vertical opening through the charging box is formed by the plates 90 and 92. The rear end of the charging box is open but may include the vertical stiffening members 94, as will best be seen in Figure 5.

The charging box includes a top plate 96 extending outwardly from the sides of side plates 88 and forwardly from front plate 90 and being apertured in alignment with the space between plates 90 and 92.

The charging box is adapted for receiving an insert in the space between plates 90 and 92 so that the capacity of the charging box will be that required for filling the cavities of the particular mold that is in the press. This assembly consists of the vertical plates 98 welded together, and with a top plate 100 being provided at the upper outer periphery of the welded assembly to overlie the top surface of the charging box to support the insert thereon. Bolts extending through plate 100 into top plate 96 of the charging box provide means for securing the insert detachably in position. A flush plate 102 may be mounted on the back portion of top plate 96 so that the upper surface of the charging box, after the insert has been placed therein, is perfectly flat thus permitting the arrangement within the press frame of a filling chute for the charging box.

As will be seen in Figure 5, the chamber within the insert for the charging box comprises a central partition so that the said chamber is divided into two chambers and, as will become more evident hereinafter, this is to acommodate the charging box insert to a two-cavity mold.

As will best be seen in Figures 1, 2, 3 and 5, the charging box carries the spaced rollers 104 on opposite sides and also on opposite ends that engage the channel-shaped tracks 106 located within the frame, and at the rear end of the frame there is a transversely extending support 110 engaging the rear ends of the tracks in supporting relation. By means of the tracks supporting the charging box assembly, the said assembly is reciprocable within the press frame from its Figure 1 position forwardly in the press frame to bring the spaces in the insert in the charging box into vertical registration with the cavities in the mold assembly.

Reciprocation of the charging box is accomplished by means of the arms 112 having their lower ends pivoted to the frame and being connected at their upper ends by the drag links 114, with the pivot pins 116 arranged on opposite sides of the charging box. A hydraulic cylinder 118 located within the press frame has one end anchored to the press frame and its other end connected with one of arms 112 intermediate its ends whereby energization of the motor will bring about reciprocation of the charging box in the press.

*Crosshead assembly*

The crosshead assembly, which is in the upper part of the press frame and which accomplishes the compacting of the material in the mold cavities, will best be seen in Figures 1, 2 and 8 through 15. This crosshead assembly comprises a pair of spaced vertically extending plates 130 having a plate extending transversely therebetween adjacent the upper end at 132, and another transversely extending plate 134 spaced upwardly from the bottom ends of plates 130. Extending between plates 132 and 134, on the vertical center line of the crosshead, is a cylinder member 136 open at its opposite ends and having a cutout 138 in the front thereof adjacent the bottom. Transverse plate 140 is welded within cylinder memeber 136 at the upper level of opening 138, and plate 140 serves as a point of attachment for a ram 142 that extends into a cylinder 144, the upper end of which extends upwardly through the upper end of the frame of the press and is connected therewith as by means of the trunnion support 146, 148 on top of the press frame. The ram 142 is preferably resiliently connected with plate 140 as by the rubber washer 150.

Resiliently secured to lower plate 134 is a vibrator unit generally indicated at 152. This vibrator unit, as will be seen hereinafter, when driven creates vertical vibratory forces acting on the crosshead assembly. The vibrator unit is drivable by pulley 154 thereon, over which passes a drive belt 156 which also passes about the driven pulley 158 of a hydraulic motor 160 that is mounted on the inside of one of the gusset plates 162 which are located, as will be seen in Figure 9, between the bottom of plate 134 and the lower ends of side plates 130 of the crosshead assembly at the front and back sides of the crosshead.

The belt 156 is maintained taut by the weighted idler pulley 164 carried on an arm 166 pivoted to the support block 168 carried on top plate 134.

For maintaining the vibrator unit 152 properly located within the crosshead assembly there is provided an upper set of radius rods 170 pivoted at one end to plates 162 adjacent hydraulic motor 160 and at their upper ends to the top part of the vibrator unit. A similar pair of radius rods 172 are similarly pivoted between the plates 162 and the lower portion of the vibrator unit.

The nature of the connection between the vibrator unit and the plate 134 is illustrated in Figure 23, where it will be noted that there is a bronze bushing 171 in plate 134 through which extends an elongated rod 173 that also passes through the frame of the vibrator unit 152. Arranged between the vibrator unit and bushing 171 are a plurality of rubber washers 174 and intervening metallic washers 176. Between plate 134 and the upper end of rod 173 are also arranged a plurality of rubber washers 174 with intervening metal washers 176. Nuts 178 on the upper end of rod 173 serves to clamp the assembly together. Rods 173, at their lower ends, carry the nuts 180 bearing against the bottom of the frame of the vibrator unit, and nuts 182 which clamp a plate 184 on the bottom of the vibrator unit.

Referring to Figures 10 through 15, it will be observed that plate 184 is a portion of a welded assembly extending downwardly from the vibrator unit and comprising the two leg portions 186, each of which terminates at the bottom in a flat die supporting plate 188. Each plate 188, at each end thereof, carries a tapered socket 190 which is adapted for receiving a ferrule 192. The ferrules 192 taper downwardly and abut the tops of upper die plates 86, and are retained fixed to the said die plates by the bolts 196. When the die plates 86 are not in engagement with the work, each hang beneath their pertaining plates 188 in spaced relation thereto, as will be seen in Figure 10, and fixed in position relative thereto by the engagement of the tapered ferrules in their pertaining sockets. However, when the die plates 86 are brought into engagement with material to be presssed they move upwardly to their Figure 11 position relative to their supporting plate 188, and this will provide clearance between the tapered ferrules attached to the die plates and the sockets therefor so that lateral movement of the die plates relative to their supporting plates can be had, whereby shifting of the material that is being compacted within the mold cavity can take place thereby to provide for more uniform density of the finished product than could be had if the die plates were not movable within the mold cavity.

Preferably there is a thin layer of a resilient material, such as plastic bonded asbestos or brake lining, at 198 on the lower face of each plate 188, thus providing a resilient thrust transmitting medium for exerting pressing force on the adjacent die plate. This serves to reduce the noise of operation of the press.

A latch 199 engages the crosshead at the top of its stroke to hold the crosshead up should the pressure in the fluid system drop, and is adapted for retraction by the supply of fluid pressure to motor 160.

Ejector assembly

The ejector assembly, by means of which finished work members are ejected from the mold cavities, will be seen in Figures 1 and 2.

In Figure 2 it will be noted that the mold assembly comprises two cavities 84, and vertically reciprocable in each of the said cavities is a lower die plate 200. The lower die plates 200 are fixed to the ejector plates 202 that are secured to the upper ends of rods 204 which have their lower ends extending through a crosshead 206 that is attached to the upper end of a ram 208 extending into a cylinder 210. Spring means 212, between the lower ends of rods 204 and the lower surface of crosshead 206, provide a resilient connection between the crosshead and the rods while the collars 214 above the crosshead provide for a positive upward movement of the rods by the crosshead.

As will be seen in Figure 1, the upper end of cylinder 210 has connected therewith the supporting strain rods 216 which are rigid with the bolster plate 68, whereby the cylinder is fixedly supported within the press frame.

Between the upper surface of bolster plate 68 and the ejector plates 202 is a rubber pad 218 which resiliently supports the ejector plates and bottom die plates in their lowermost position. It will be apparent that upward movement of ram 208 will serve to eject work members from the cavities 84 to the upper surface of the mold assembly.

Pickup mechanism

As will be seen in Figures 1, 2, 5 and 6, the charging box has mounted on its front face a plurality of brackets 250 arranged in spaced relation and pivotally supporting the shaft 252.

Mounted on shaft 252, immediately inwardly of the outermost of the brackets 250, is a pair of pickup arms or fingers 254 that extend forwardly from the front of the charging box in such a manner as to be positioned adjacent the cavities of the mold assembly when the charging box is in its retracted position, as will best be seen in Figure 1.

In about the center of shaft 252, between the two innermost brackets 250, is a third pickup arm or finger 256 which also extends forwardly from the front of the charging box and is positioned vertically over the central dividing plate in the mold assembly, and is thus located between the cavities of the mold assembly.

A tie bolt 258 transverses the three arms and the sleeves 260 between the arms and determines the spacing thereof. The arms are all secured to shaft 252 to rotate therewith, and at one end the shaft has a crankarm 262 thereon upstanding adjacent one of the front edges of the charging box. Pivotally connected with the upper end of crankarm 262 is a ram 264 that extends into a cylinder 266 pivoted to the side of the charging box at 268. This ram and cylinder is shown in section in Figure 27 wherein it will be noted that a compression spring 270 is provided that normally holds the ram in extended position in the cylinder, whereas a supply of fluid under pressure to the cylinder through conduit 272 will act on the piston head 274 of the ram and force the ram inwardly of the cylinder until the piston head engages the stop button 276.

Each of the side pickup arms or fingers 254 is constructed in the manner shown in the sectional view in Figure 26. In this figure it will be noted that spaced along the pickup arm or finger are the bushings 278, and in the two outermost bushings are arranged the plungers 280 that have secured thereto on the inner side of the pickup arm the pressure plate 282 having a resilient non-abrasive facing 284. On the opposite side of bushings 278 plungers 280 have pins 286 retaining thereon washers 288, and between which washers and the pickup arm or finger are arranged the compression springs 290. Stop collars 292 provide means for limiting the movement of plungers 280 against the thrust of springs 290.

The central bushing 278 forms a cylinder in which there is a metal plunger 292 engaging the back surface of pressure plate 282, and in back of which plunger is a rubber-like cup 294. A conduit 296 threaded into the bushing provides means for supplying pressure fluid to the right hand face of cup 294 for forcing pressure plate 282 inwardly against the thrust of springs 290.

It will be apparent that when pressure fluid is supplied to the conduits 296 of the outer pickup arms, work members mounted between the outer pickup arm and the center pickup arm 256 will be gripped therebetween. Thereupon, a supply of pressure fluid through conduit 272 to cylinder 266 will cause ram 264 to move inwardly of the cylinder, thus rotating shaft 252 in a direction to move the pickup arms and fingers and the work members gripped therebetween upwardly. Thereafter, the charging box can be moved forwardly in the frame to convey the gripped and elevated work members to table 60.

Vibrator unit

The vibrator unit, forming a part of the crosshead assembly which carries the upper die plates and which is resiliently supported by plate 134 of the crosshead, is illustrated in some detail in Figures 17 through 22. In these figures it will be noted that the vibrator unit comprises a casing consisting of the parts 300 and 302 which are secured together and which form supports for the antifriction bearings 304 that rotatably support the rotary members 306 and 308 which comprises off-center masses. Members 306 and 308 are geared together as by gear means 310, and one of the members is provided with an input shaft 312 whereby driving the shaft 312 will cause the members to rotate in unison. The off-center masses of the members 306 and 308 are so arranged that the vibratory force will be imparted to the casing of the vibrator unit in a vertical direction, and which vibratory force will, of course, be transmitted to the carrier for the upper die members and to the upper die members also.

The bearings 304 are advantageously retained in proper position within the casing of the vibrator unit by the bearing caps 314, and the upper portion 300 of the casing of the vibrator unit comprises an upstanding lug 316 for connection with the upper radius rods 170 (Figures 8 and 9), while the lower portion 302 of the casing of the vibrator assembly comprises the depending lug means 318 for connection with the lower radius rods 172 (Figure 8).

Mold assembly

The mold assembly, see in section in Figures 1 and 2 and in plan in Figure 4, is illustrated somewhat more in detail in the exploded perspective view, Figure 33. In this figure it will be observed that the mold assembly comprises the front and back walls 340, and extending therebetween at the ends are the end walls 352 bolted to the front and back walls as by screws 354 and with the walls being keyed together by the rectangular keys 356. The two side walls 352 have their inner surfaces inclined downwardly and inwardly as at 358 (see Figure 34), and engaging these inclined walls are the wedge members 360 through which pass the screws 362 that threadedly engage the lower portions of the side walls 352 so that tightening of the screws will drive the wedges downwardly along the inner surfaces 358 and thus force the wedge members inwardly. This arrangement is availed of for adapting the mold assembly to different sizes of workpieces by providing the assembly with the filler plates 364 fitting against the inner sides of wedges 360 and being adapted for abutting the outer surfaces of the mold end liner plates 366 which have their inner upper edges at 367 beveled. It will be apparent that by selecting predetermined sizes for the filler plates 364 the sizes of the cavities in the mold can readily be determined.

Disposed between the ends of the back plates 364 are the front and back liner back plates 368, of which there are two at the front side of the mold and two at the back side. Between the inner ends of the back plates 368 is the center mold box liner plate 370 dividing the space with the mold assembly into two chambers and inset flush into the faces of the back plates 368 are the liner plates 372. The top edge of center liner plate 370 is beveled on both sides at 371, while the back plates 368 have their inner upper edges beveled as at 373.

The back surfaces of the back plates 364 and 368, as well as the adjacent ends of the liner plates, are formed with projecting portions that define a transversely extending tenon 380 that fits in a corresponding groove 382 in the adjacent direction of the front and back walls 350 of the mold assembly. In this manner a mold assembly is made which can be adjusted as to size, which is strong and accurate, and which has removable wear plates on the interior which can readily be removed and replaced for reconditioning the mold after it becomes worn.

Press frame

The frame of the press, according to this invention, is illustrated in Figures 29 through 32, wherein it will be seen that the press frame comprises the aforementioned side plates 80, and extending across the front thereof is a front plate 402 cut out to define the opening 52 in the front of the press. Side plates 80 are provided with the apertures 404, to which are secured the circular flanges 406. This arrangement provides for the supporting within the press frame of guide means for the crosshead of the press, as will hereinafter be described.

As will be seen in Figure 31, there extends transversely between the side plates 80 rearwardly of front plate 402 a second plate 408 defining a space within which the crosshead of the press moves. The side plates 80, rearwardly of plate 408, are provided with brace members 410 welded thereto to stiffen the plates but with brace members 410 spaced apart so that the back of the press is opened, as will be seen in Figure 32. The space in the press frame in which the crosshead moves is preferably braced by the angles 409 welded into the corners where plates 400, 402 and 408 meet, and extending to the bottom of the press frame.

At the bottom in the back the press frame comprises the previously referred to oil sump 74, which is provided by forming a boxlike oil-tight compartment within the press frame that is advantageously divided by the partition 412 which separates the oil return conduit 414 from the pump 76. Partition 412 is preferably notched along its bottom edge at the ends to permit the transfer of oil between the two chambers of the sump.

Crosshead guide

According to this invention a novel guide arrangement is provided for the crosshead, and which arrangement will best be seen in Figures 1, 8, 9 and 28.

The referred-to guiding arrangement comprises a pair of spaced V shaped rails 450 secured to each side of the crosshead and a single V shaped rail 452 fixed to the inside of each side of the press frame. The three rails, at each side of the crosshead, cooperate to guide the crosshead in its vertical movement. The rails 450 are mounted on the crosshead as on the pads 454 welded in spaced relation along opposite sides of the crosshead and with bolts 456 extending through the pads and the side plates of the crosshead into threaded engagement with the rails 450.

The rail 452 is supported on the side plates 400 of the press frame by the disc-like support members 458 which are bolted onto the flanges 406 by the bolts 459, with their center portions extending through the apertures 404 in the side plates 400 of the press frame into engagement with the back surfaces of the rails 452. Bolts 460 are provided for clamping the rails 452 to the supporting members 458.

The members 458 are adapted for adjustable support on the flanges 406 by means of the semicircular shims 462, as best seen in Figure 28. This provides means for fixing the rails 452 in position within the frame of the press so that accurate guiding of the crosshead is had at all times, and so that wear of the rails 452 can be compensated for. The location of the support members 458 externally of the press frame makes it a simple matter to effect said adjustments.

Hydraulic circuit

The hydraulic control circuit for the press is illustrated in Figure 34, wherein it will be seen that pump 72 discharges into a conduit 500. Between conduit 500 and an exhaust manifold 502 is a pressure relief valve 504 which may be set for a thousand pounds per square inch. Conduit 500 leads to the pressure inlet of a four-way reversing valve V-3 having an actuating solenoid S-3. When solenoid S-3 is de-energized conduit 500 is connected with conduit 506, and conduit 508 is connected to exhaust; whereas, when solenoid S-3 is energized conduit 500 is connected with conduit 508, and conduit 506 is connected with exhaust. Conduit 508 leads to the inlet of fluid motor 160 for the vibrator unit, and motor 160 is advantageously by-passed by a pressure compensated control valve 510 so that the speed of motor 160 can be set to the proper amount. Conduit 509, branching off from conduit 508, leads to latch 199 for the crosshead so energization of motor 160 will be accompanied by release of the crosshead.

Conduit 506 leads to the lower end of cylinder 144 so that when conduit 506 is under pressure crosshead ram 142 is urged upwardly in cylinder 144. A needle valve 512 is connected between conduit 506 and sump 74 to permit manual control of the press during set-up, while a second pressure relief valve 514, which may be set at 500 pounds per square inch, is connected between conduit 506 and exhaust.

Branching off from conduit 506 is a conduit 516 which leads to the inlet of a four-way reversing valve V-1 having a solenoid S-1. When solenoid S-1 is de-energized conduit 516 is connected with the retracting side of the charging box motor 118 to urge the charging box toward retracted position, whereas, when solenoid S-1 is energized, the advancing side of motor 118 is connected to conduit 516 to advance the charging box.

Conduit 516 leads also to the inlet of valve V-4 having an operating solenoid S-4. When solenoid S-4 is de-energized conduit 516 is blocked off while the service conduit 518 is connected with exhaust, whereas, when solenoid S-4 is energized, conduit 518 is connected to conduit 516 to receive pressure therefrom. Conduit 518 leads through a needle valve 520 to the inlet of cylinder 266 within which is lift plunger 264. Conduit 518 also leads to the inlets of cylinders 294 for the clamp plungers 292. Movement of lift plunger 254 is resisted by spring 270 which is stronger than the springs 290 resisting movement of the clamp plungers so that when conduit 518 is under pressure the clamp plungers will move inwardly and, thereafter, the lift plunger will operate.

Conduit 516 also leads to the inlet of a valve V-2 having an actuating solenoid S-2. When solenoid S-2 is de-energized conduit 522 is connected with conduit 516, while conduit 524 is connected with exhaust, and when solenoid S-2 is energized conduit 524 is connected with conduit 516, while conduit 522 is connected with exhaust. When solenoid S-2 is energized pressure fluid delivered to conduit 524 will pass through check valve 526 to the lower end of cylinder 210 and drive ejector ram 208 upwardly, whereas, when solenoid S-2 is de-energized, pressure will be supplied through conduit 522 to the upper end of cylinder 210, while the discharge of fluid from the lower end of cylinder 210 will be prevented by check valve 526. Movement downwardly of ejector ram 208 is then accomplished by releasing fluid from the lower end of cylinder 210 through valve V-5 having an operating solenoid S-5, as illustrated in section in Figure 37.

Figure 37:
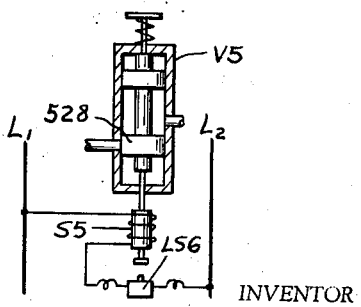
Figure 37 is a sectional view showing the construction of the vibrator-valve arrangement associated with the ejector plunger of the press.

In Figure 37 it will be noted that valve V-5 comprises a valve member 528 normally blocking the flow of fluid through the valve but movable into position to permit fluid flow through the valve upon energization of solenoid S-5. The energizing circuit includes a normally closed limit switch LS-6 which is adapted for being opened by the armature of solenoid S-5 when the armature is moved by energization of the solenoid. It will be apparent that closing of the energizing circuit for solenoid S-5 will thus produce vibratory motion of valve member 528, thereby releasing fluid from the cylinder 210 incrementally whereby ram 208 will move downward with a vibratory motion.

Electric control circuit

Figure 36:
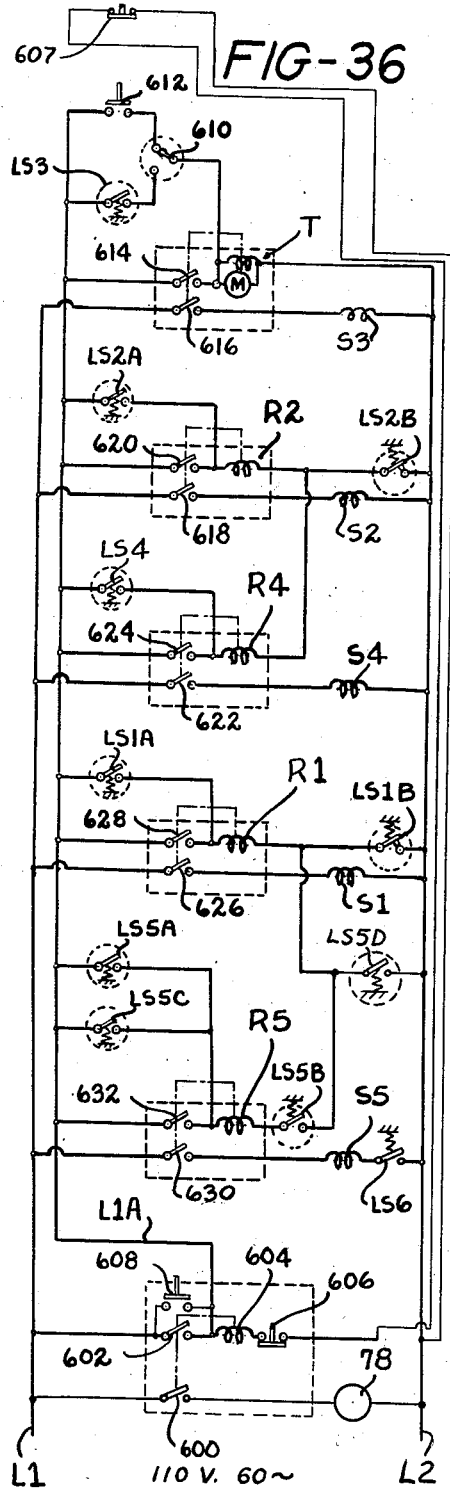
Figure 36 is a diagrammatic representation of the electric control circuit for controlling the hydraulic system of the press.
Figure 35:
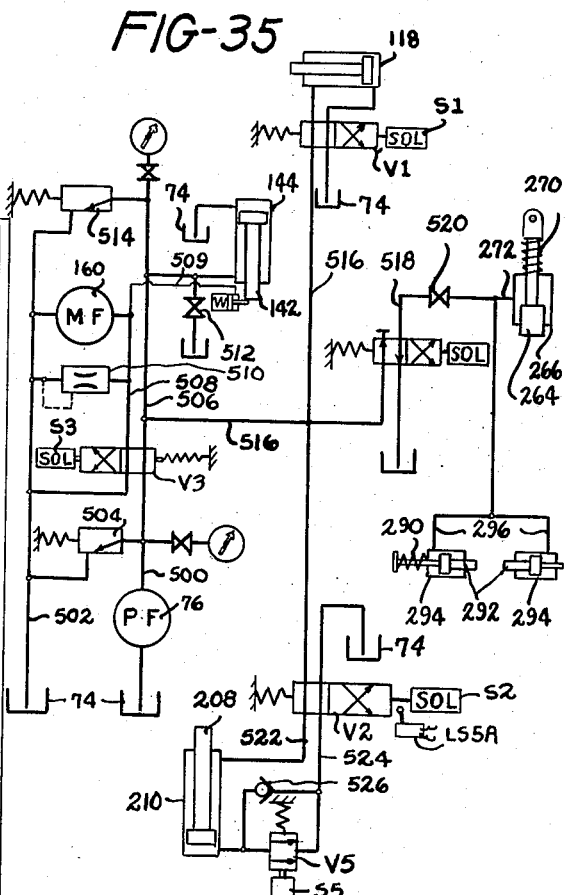
Figure 35 is a diagrammatic view of the hydraulic circuit for the press.

The electric control circuit for controlling the energization of the several valve operating solenoids of Figure 35 is illustrated in Figure 36. In Figure 36 the main power lines are indicated at L-1 and L-2, and connected therebetween are the several valve solenoids S-1, S-2, S-3, S-4 and S-5, and the motor starter relay.

The motor starter relay, in the construction of Figure 36, includes a blade 600 in series with motor 78 and a holding blade 602. The blades 600 and 602 are adapted for being closed by energization of a coil 604 in series with the normally closed stop buttons 606 and 607 and the normally open start button 608 which by-passes blades 602. Closure of blade 602 connects a line L-1A with power line L-1, and between L-1A and L-12 are connected the coils of relays R-1, R-2, R-4, R-5 and the timer T. Switch 607 is located adjacent the operator's position so that in case of an emergency the water can be stopped.

At the top of Figure 36 there is illustrated the timer T, and in series therewith is selector switch 610 which, in one position, connects the timer with the manual push button 612, and in its other position connects the timer in series with a limit switch LS-3 adapted for being closed by the ejector ram 208 at the bottom of its stroke. LS-3 provides for automatic cycling of the machine if automatic operation thereof is desired.

Timer T comprises a holding blade 614 and a second blade 616 which is in series with solenoid S-3 of valve V-3.

The solenoid S-2 of valve V-2 is controlled by a blade 618 which is operated by relay coil R-2, and which relay coil also has a holding blade 620. Relay coil R-2 is adapted for being energized by closure of a limit switch LS-2A which is momentarily closed by the crosshead of the press at the top of its stroke.

Also in series with relay coil R-2 is a limit switch LS-2B adapted for being momentarily opened by the charging box at the end of its advancing stroke.

Solenoid S-4 of valve V-4 is adapted for being energized by a blade 622 controlled by a relay coil R-4, and which relay coil also comprises a holding blade 624. Relay coil R-4 is adapted for being energized by closing of the limit switch LS-4 arranged for being momentarily closed by ejector ram 208 at the top of its stroke. Relay coil R-4 is likewise in series with limit switch LS-2B so as to be de-energized when limit switch LS-2B is opened.

Solenoid S-1 is adapted for being energized by closing blade 626 that is controlled by relay coil R-1, the said relay coil also comprising a holding blade 622. Relay coil R-1 is adapted for being energized by closing of limit switch LS-1A arranged to be momentarily closed by the operation of lift plunger 264 when it lifts the lift fingers 254. Relay coil R–1 is also in series with a limit switch LS–1B which is momentarily opened by the ejector on the down-stroke thereof to de-energize relay coil R–1.

Valve solenoid S–5, in association with vibrator valve V–5 previously referred to, is adapted for being energized by closing of a blade 630 controlled by relay coil R–5, and which relay coil also comprises a holding blade 632. Relay coil R–5 is adapted for being energized by closing of a limit switch LS–5A which is adapted for being momentarily closed upon de-energization of valve solenoid S–2, or by closing of limit switch LS–5A which is adapted for being momentarily closed by the charging box at the end of its retracting stroke. Relay coil R–5 is connected in circuit with limit switch LS–1B so as to be de-energized when LS–1B is opened, and is also in series with limit switch LS–5B adapted for being momentarily opened by ejector ram 208 at the end of its retracting stroke. A limit switch LS–5D is connected in parallel with limit switch LS–1B, and is adapted for being closed by the charging box at the end of its retracting stroke to permit further retraction of the ejector ram after it has stopped on limit switch LS–1B.

*Operation*

To describe an operative cycle of the press, let it be assumed that the mold cavities contain charges of material to be compacted, and that the charging box is retracted and the crosshead is at the top of its stroke. A cycle is then commenced by closing switch 612 which will energize timer T, and which, in turn, will close blade 616 to energize solenoid S–3 of valve V–3. Energization of valve V–3 will connect conduit 516 with exhaust to permit the crosshead of the press to move downwardly to bring the die plates carried on the bottom thereof into engagement with the material to be compacted in the mold cavities.

Simultaneously, conduit 508 will be connected with conduit 500 thereby to energize fluid motor 160 which will energize the vibrator mounted on the crosshead and also release latch 199, thereby causing the crosshead to advance into the work with a vibratory motion.

The die plates 194 that are carried on the crosshead are held in a fixed position thereon by the tapered ferrules 192 in the sockets 190 until the die plates engage the material in the mold cavities. The die plates will then move upwardly against the facing 196, at which time the ferrules will be released from engagement with their respective sockets. This will permit lateral movement of the die plates relative to the crosshead so that the material within the mold cavities can shift laterally as may be necessary in order to provide uniform density of the material being compacted. In this manner a superior product is produced by eliminating voids and zones of smaller density than the average density of the product produced. The vibratory motion of the die plates is augmented by the rubber pad 218 associated with the ejector of the mold assembly, whereby the material being compacted is subjected to vibratory force from both sides, thus leading to improved and uniform pressing of the material, with the vibratory forces exerted thereon tending to prevent the material from sticking to the sides of the mold cavity, as could occur if the pressing force was steady and unidirectional as is the case with a conventional press.

After the elapse of a predetermined interval, the timer is de-energized, thus opening blade 616 and de-energizing solenoid S–3. This permits valve V–3 to shift into position to de-energize fluid motor 160, while simultaneously supplying pressure fluid to conduit 516. The supply of pressure fluid to conduit 516 will retract the crosshead of the press upwardly. At the top of its stroke the crosshead momentarily closes limit switch LS–2A thereby energizing relay coil R–2 which closes blade 618 to energize solenoid S–2 of valve V–2. Energization of solenoid S–2 will shift valve V–2 into position to supply pressure fluid through conduit 524 and check valve 526 to the bottom of cylinder 210, thus forcing ejector plunger 208 upwardly and ejecting the finished bricks from the mold cavities (Figs. 38 and 39).

At the top of its stroke the ejector plunger momentarily closes limit switch LS–4 thereby energizing relay coil R–4 to close blade 622 thereby to energize solenoid S–4 of valve V–4. Energization of solenoid S–4 will shift valve V–4 to supply pressure fluid to conduit 118, which will first energize the clamp plungers 294 to clamp the bricks between fingers 254 and 256, and will then energize lifter plunger from the top of the mold assembly (Fig. 40).

The lifting of the fingers momentarily closes limit switch LS–1A, thus energizing relay coil R–1, closing blade 626 thereof, and energizing solenoid S–1 of valve V–1. Energization of solenoid S–1 will shift valve V–1 into position to advance the charging box thereby conveying the clamped and elevated bricks outwardly over table 60, while simultaneously bringing the loaded box into position over the mold cavities.

At the end of its advancing stroke the charging box momentarily opens limit switch LS–2A, thus de-energizing relay coil R–2 and relay coil R–4 and therethrough de-energizes solenoid S–2 and solenoid S–4 of valve V–2 and valve V–4. This de-energizes the lift cylinder and clamp plunger for depositing the bricks on table 60, and likewise reverses the energization of ejector plunger 208 to bias the said plunger downwardly. Movement of valve V–2, upon de-energization of solenoid S–2 thereof, momentarily closes limit switch LS–5a, thus energizing relay coil R–5, closing blade 630 thereof, and energizing solenoid S–4 of vibrator valve V–5. Energization of solenoid S–5 will cause vibratory movement of valve V–5 in the manner previously described so that the ejector will move downwardly with a vibratory motion, thus causing the transfer of material from the charging box into the mold cavities and simultaneously vibrating and shaking down the charge of material so that it is precompacted within the mold cavities and is relatively free of voids and is, more or less, uniformly distributed therein (Fig. 41).

During its downward travel the ejector plunger opens limit switch LS–1B, thus de-energizing relay coil R–1 and relay coil R–5 thereby de-energizing solenoids S–1 and S–5. De-energization of solenoid S–1 will reverse the energization to the charging box motor, thus bringing about retraction of the charging box while de-energization of solenoid S–5 will bring about halting of the downward movement of the ejector plunger. At the end of its return stroke the charging box momentarily closes limit switch LS–5C and also closes limit switch LS–5D which is in parallel with limit switch LS–1B, thus again energizing relay coil R–5 to again close blade 630 which, in turn, will again energize solenoid S–5 so that the ejector plunger will continue its downward stroke. At the bottom of its downward stroke the ejector plunger momentarily opens limit switch LS–5B, thereby de-energizing relay coil R–5 and de-energizes solenoid S–5 to halt the downward movement of ejector plunger and also closes limit switch LS–3.

At this point a complete cycle has been carried out, and if selector switch 610 is in its upper position a new cycle can be connected by closing limit switch 612. If, on the other hand, selector switch 610 is in its lower position closing of limit switch LS–3 will automatically institute a new cycle. The cycle previously described obtains when the amount of material delivered to the mold cavities is measured by volume, with the said volume being determined by the position to which limit switch LS–1B is adjusted.

It is also possible to operate the press with a weighed charge of material as, for example, by delivering a predetermined weighed charge of the charging box, and in which case limit switch LS–5C is eliminated from the circuit, limit switch LS–5B is shorted out, and limit switch LS-3 is placed to be engaged by the charging box at the end of its retracting stroke.

With the electric circuit modified as referred to above, the operation of the press would differ in that the ejector plunger would momentarily open limit switch LS-1B at the bottom of its stroke to halt the movement of ejector plunger, and also to bring about retraction of the charging box.

A the end of the retraction stroke of the charging box it would close limit switch LS-3, thus preparing the control circuit for a new cycle.

From the foregoing it will be evident that we have devised a novel press structure and a method of operation particularly useful for compacting particulate materials, but which can also be employed in connection with the pressing of other substances as well. The press has been illustrated with two workpieces being formed at one time, but a single workpiece could as well be produced according to this invention, or more than two workpieces could be produced merely by providing a multi-cavity mold assembly and a corresponding number of pressing plungers.

It will be understood that this invention is susceptible to modification in order to adapt it to different usages and conditions and, accordingly, it is desired to comprehend such modifications within this invention as may fall within the scope of the appended claims.

We claim:

1. In a press; means forming a mold cavity having a mold bottom, a compacting member movable into said mold cavity from above for engaging the material therein, a die plate suspended from beneath said compacting member, means suspending said die plate from said compacting member so that said die plate is held thereon against lateral movement when suspended from the compacting member but having freedom of lateral movement relative to said compacting member when engaging the material in said mold cavity, vibrator means associated with said compacting member energizable for vibrating said compacting member vertically, means resiliently supporting said mold bottom, and means for driving said mold bottom upwardly to eject a compacted work member from said cavity.

2. In a press; means forming a mold cavity having a mold bottom, a compacting member movable into said mold cavity from above for engaging the material therein, a die plate suspended from beneath said compacting member, means suspending said die plate from said compacting member so that the die plate is held thereon against lateral movement when suspended from the compacting member but having freedom of lateral movement relative to said compacting member when engaging the material in said mold cavity, vibrator means associated with said compacting member energizable for vibrating said compacting member vertically, means resiliently supporting said mold bottom, and means for driving said mold bottom upwardly to eject a compacted work member from said cavity, there being a facing of at least slightly resilient material between said compacting member and die plate to prevent direct contact therebetween.

3. In a press; means forming a mold cavity opening upwardly, a compacting member reciprocably mounted in the press above said cavity and having a dependent die portion adapted for entering said cavity, said die portion comprising a die plate dependently supported thereunder, and means supporting said die plate on said die portion for preventing lateral movement of said die plate on said die portion until the die plate engages material in said mold cavity, and for thereafter permitting lateral movement of said die plate on said die portion.

4. In a press; means forming a mold cavity opening upwardly, a compacting member for compacting material in said cavity and comprising a dependent die portion, a die plate suspended beneath said die portion in spaced relation thereto, said die plate comprising vertical support ferrules tapering outwardly toward the top, and said die member comprising tapering sockets for receiving said ferrules whereby said die plate is accurately guided into said mold cavity, and upon engaging the material therein is free to move laterally of said die member.

References Cited in the file of this patent

UNITED STATES PATENTS

| | | |
|---|---|---|
| 716,461 | McElheny | Dec. 23, 1902 |
| 917,851 | Cross | Apr. 13, 1909 |
| 1,652,883 | Ackermann | Dec. 13, 1927 |
| 1,770,303 | Enticknap | July 8, 1930 |
| 1,791,583 | Stoney | Feb. 10, 1931 |
| 1,814,159 | Housman | July 14, 1931 |
| 1,871,413 | Koch | Aug. 9, 1932 |
| 1,905,619 | Carton | Apr. 25, 1933 |
| 1,946,708 | Muenzer | Feb. 13, 1934 |
| 1,957,421 | Daniels et al. | May 1, 1934 |
| 2,198,767 | Glasner | Apr. 30, 1940 |
| 2,218,196 | Hagar | Oct. 15, 1940 |
| 2,287,675 | Fair et al. | June 23, 1942 |
| 2,341,012 | Billman et al. | Feb. 8, 1944 |
| 2,367,486 | Denham | Jan. 16, 1945 |
| 2,375,191 | Bower | May 8, 1945 |
| 2,407,168 | Lindkvist | Sept. 3, 1946 |
| 2,492,297 | Lagarde | Dec. 27, 1949 |
| 2,542,584 | Sherman et al. | Feb. 20, 1951 |
| 2,584,534 | Barnhardtson | Feb. 5, 1952 |
| 2,586,210 | Corwin | Feb. 19, 1952 |
| 2,652,613 | Warren | Sept. 22, 1953 |
| 2,674,008 | Van Der Pyl | Apr. 6, 1954 |
| 2,685,116 | Schutt | Aug. 3, 1954 |
| 2,685,117 | Rivers | Aug. 3, 1954 |

FOREIGN PATENTS

| | | |
|---|---|---|
| 516,099 | France | Dec. 2, 1920 |
| 463,687 | Canada | Mar. 14, 1950 |
| 143,656 | Australia | Oct. 3, 1951 |